(12) United States Patent
Nelson-White

(10) Patent No.: US 6,342,835 B1
(45) Date of Patent: Jan. 29, 2002

(54) SENSOR PANEL AND A DETECTION APPARATUS INCORPORATING THE SAME

(76) Inventor: Ian David Nelson-White, 9 Regal Drive, Thornlie, Western Australia, 6108 (AU)

( * ) Notice: Subject to any disclaimer, the term of this patent is extended or adjusted under 35 U.S.C. 154(b) by 0 days.

(21) Appl. No.: 09/446,364

(22) PCT Filed: Jun. 18, 1998

(86) PCT No.: PCT/AU98/00472

§ 371 Date: Mar. 23, 2000

§ 102(e) Date: Mar. 23, 2000

(87) PCT Pub. No.: WO98/58277

PCT Pub. Date: Dec. 23, 1998

(30) Foreign Application Priority Data

Jun. 18, 1997 (AU) .............................. PO 7470

(51) Int. Cl.[7] .................................................. H04N 5/04
(52) U.S. Cl. ...................... 340/551; 340/552; 340/572.4
(58) Field of Search ................................. 340/551, 552, 340/572.1, 572.2, 572.4, 825.31, 825.34, 561; 324/243, 239, 326, 329

(56) References Cited

U.S. PATENT DOCUMENTS

| 4,030,026 | A | * | 6/1977 | Payne | ........................ 324/329 |
|---|---|---|---|---|---|
| 4,305,035 | A | * | 12/1981 | Mach et al. | ................. 324/255 |
| 4,990,850 | A |   | 2/1991 | Votruba | ...................... 324/225 |
| 5,134,370 | A | * | 7/1992 | Jefferts et al. | ............... 324/247 |
| 5,397,986 | A |   | 3/1995 | Conway et al. | ............. 324/243 |
| 5,521,583 | A | * | 5/1996 | Frahm et al. | ................ 340/551 |
| 5,523,739 | A |   | 6/1996 | Manneschi | ................... 340/552 |
| 5,680,103 | A |   | 10/1997 | Turner et al. | ................ 340/551 |
| 5,689,184 | A |   | 11/1997 | Jeffers et al. | ................ 340/551 |

FOREIGN PATENT DOCUMENTS

WO          WO 95/20205          7/1995

\* cited by examiner

*Primary Examiner*—Van Trieu
(74) *Attorney, Agent, or Firm*—Nixon & Vanderhye P.C.

(57) ABSTRACT

A sensor panel including a transmit coil for producing a magnetic field in response to a source signal, a plurality of receive elements, each responsive to changes in the magnetic field incident thereon to provide an output, and a cancellation circuit arranged to remove from the outputs any signal induced in each receive element by the transmit coil. The receive elements are arranged in a matrix to provide an indication of the shape of a detected object. The sensor panel can be incorporated as part of a detection apparatus for use in airports and the like, and can also be used to detect buried landmines and ordinances.

36 Claims, 10 Drawing Sheets

SENSOR PANEL AND A DETECTION APPARATUS INCORPORATING THE SAME

FIELD OF THE INVENTION

This invention relates to a sensor panel and to a detection apparatus incorporating the same. The sensor panel uses magnetic fields to detect the presence of particular materials.

BACKGROUND ART

Detection apparatuses are commonly used to detect the presence of metal objects on or about persons entering a secure area, such as an airport.

Existing detection apparatus consist of an archway through which pedestrians walk. A single coil is connected to an oscillator, and produces an alternating magnetic field in the archway. The coil is driven by the oscillator at a tapping that is a fraction of the total turns. The signal at the total turns is utilized to detect the change in the magnetic field caused by metallic objects passing through the magnetic field.

Detection apparatus of this type are useful in providing an indication that a metal object exists, but do not give any information about the location or shape of the object. Consequently, at present security guards with hand-held detectors are used to locate the object once the existence thereof has been detected.

SUMMARY OF THE INVENTION

In accordance with the present invention there is provided a magnetic detection apparatus for sensing an object in a sensing region, the apparatus including:

a magnetic field generating means for producing a magnetic field within said sensing region in response to a source signal;

a plurality of magnetic receiving elements arranged in a matrix, each magnetic receiving element being responsive to changes in the magnetic field within the sensing region to provide an output signal;

cancellation means for generating a feedback signal adapted to minimise spurious magnetic effects of the magnetic field generating means on the output signals of the magnetic receiving elements; and, signal processing means for processing said output signals of the magnetic receiving elements and producing an image corresponding to variations produced in said output signals by the object in the sensing region whereby, in use, an indication of the location and approximate shape of the object in the sensing region can be obtained.

In one arrangement, the cancellation means comprises a feedback coil arranged to be excited by the source signal, the feedback coil inducing a feedback signal in each magnetic receiving element to negate the effects of the magnetic field generating means.

In an alternative arrangement, the cancellation means comprises a plurality of feedback coils, one for each magnetic receiving element, wherein each feedback coil is provided in close physical proximity to a corresponding magnetic receiving element, each feedback coil inducing a feedback signal in its corresponding receiving element to negate the effects of the magnetic field generating means.

In a further alternative arrangement, the cancellation means comprises a plurality of feedback coils, each coil contributing a portion of a feedback signal, first switching means arranged to selectively isolate each feedback coil so as to remove its contribution to the feedback signal, and second switching means arranged to combine said feedback signal with each output signal in turn.

Preferably, the cancellation means further comprises memory means for storing information concerning which feedback coils are to be isolated for each receiving element.

Preferably, each of said magnetic receiving elements are provided in a substantially planar configuration so as to form a sensor panel.

Preferably, each magnetic receiving element comprises a receive coil.

Preferably, each receive coil is wound on a bobbin, the bobbins being provided on the sensor panel.

Preferably, the position of the bobbins are adjustable in a direction transverse to the plane of the sensor panel whereby the output signal from each receive coil in the absence of any object in the sensing region can be minimised.

Preferably, each receive coil is provided on a printed circuit board as a spiral track thereon.

Preferably, wherein the printed circuit board is a multi-layer printed circuit board.

Preferably, the magnetic field generating means comprises a transmit coil.

Preferably, the transmit coil is provided around the periphery of the matrix of magnetic receiver elements.

In one arrangement, the magnetic field generating means comprises a first and a second transmit coil connected to an oscillator, said transmit coils being provided in a substantially parallel, spaced apart manner on opposing sides of a predetermined volume.

Preferably, the magnetic field generating means, the magnetic receiving elements and the cancellation means form a sensor panel.

Preferably, the signal processing means is arranged to further process the output signals from said receiving elements by one or more of the following methods: interpolation, Fourier analysis, edge detection, or boundary collapsing.

Preferably, the magnetic detection apparatus further comprises a camera arranged to take pictures of the volume, said image being superimposed on the pictures of said volume.

Preferably, said signal processing means is responsive to the phase and amplitude of the output signals from each receiving element to determine therefrom the type of material being detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
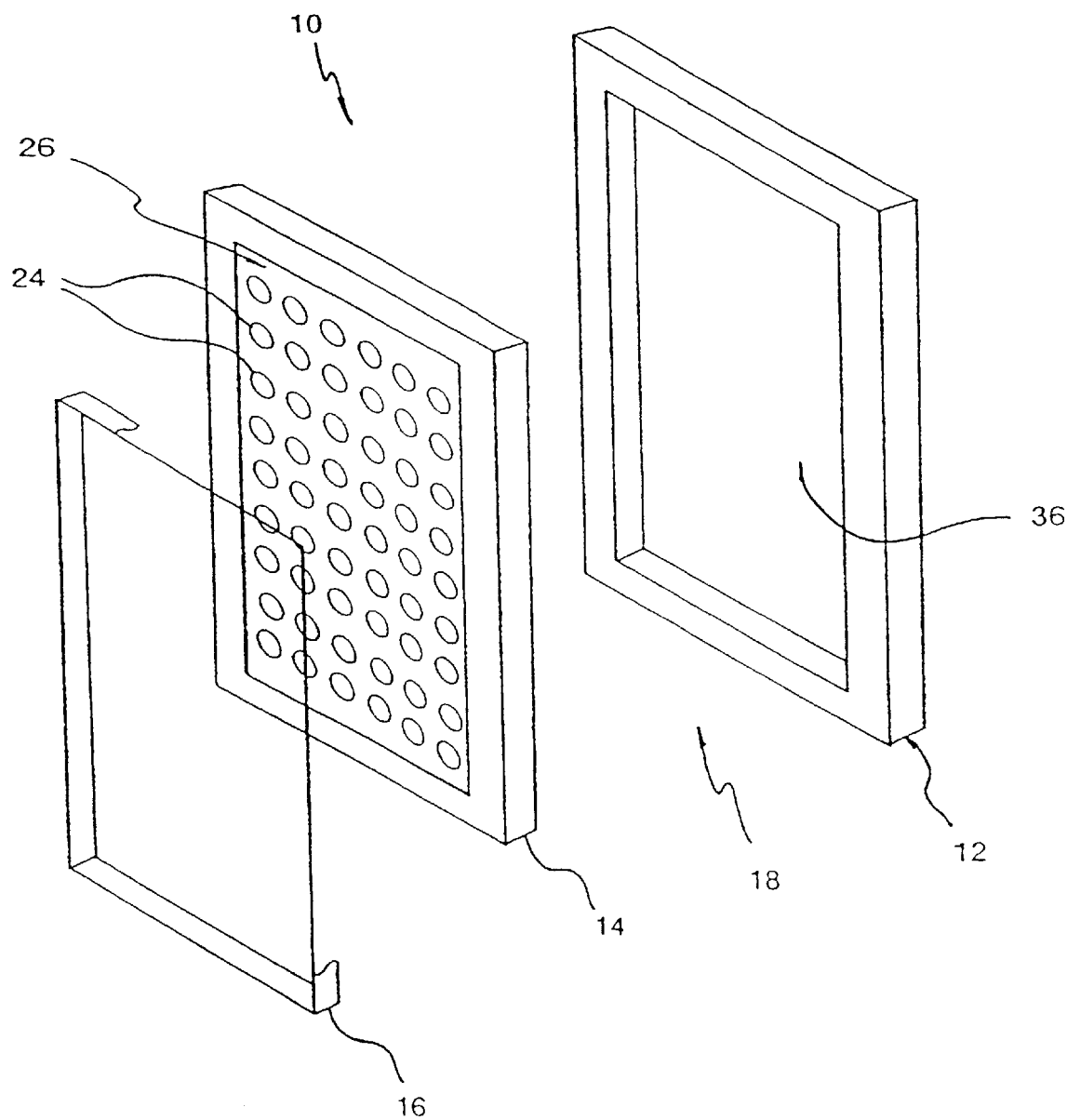
FIG. 1 is a perspective view, partially broken away, of a first embodiment of the detection apparatus according to the present invention.

The first embodiment is shown in FIGS. 1–8 and is directed towards a detection apparatus 10 (see FIGS. 1 and 2) comprising first, second and third transmit coils 12, 14 and 16, respectively. Each of the transmit coils 12, 14 and 16 are wound onto a nonconductive former and are provided substantially parallel with each other. The first and second transmit coils 12 and 14 are provided spaced apart to define a volume 18 therebetween. The transmit coils 12, 14 and 16 are of approximately human height. The volume 18 is sufficient for a person to carry hand luggage and walk comfortably therethrough.

The third feedback coil 16 is provided adjacent to the second transmit coil 14 remote from the first transmit coil 12.

Figure 2:
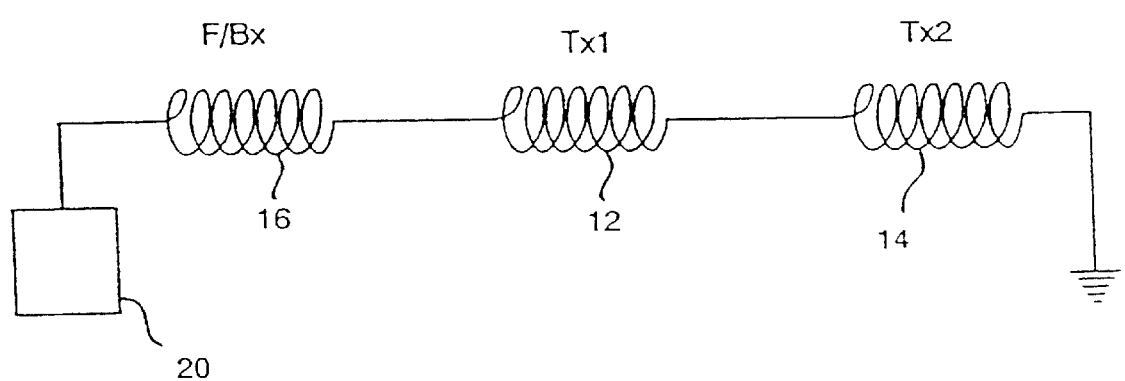
FIG. 2 is a schematic diagram of the electrical connection of the transmit coils of the first embodiment.

The transmit coils 12, 14 and 16 are connected in electrical series and are driven by an oscillator 20 (see FIG. 2). The first and second transmit coils 12 and 14 are wound onto their respective formers in the same direction and the third feedback coil 16 is wound onto its former in the opposite direction. The oscillator 20 causes the transmit coils 12, 14 and 16 to create alternating magnetic fields. The first and second transmit coils 12 and 14 are wound in the same direction and consequently act constructively. The magnetic field in the volume 18 consists of substantially parallel horizontal lines of magnetic flux.

Figure 3:
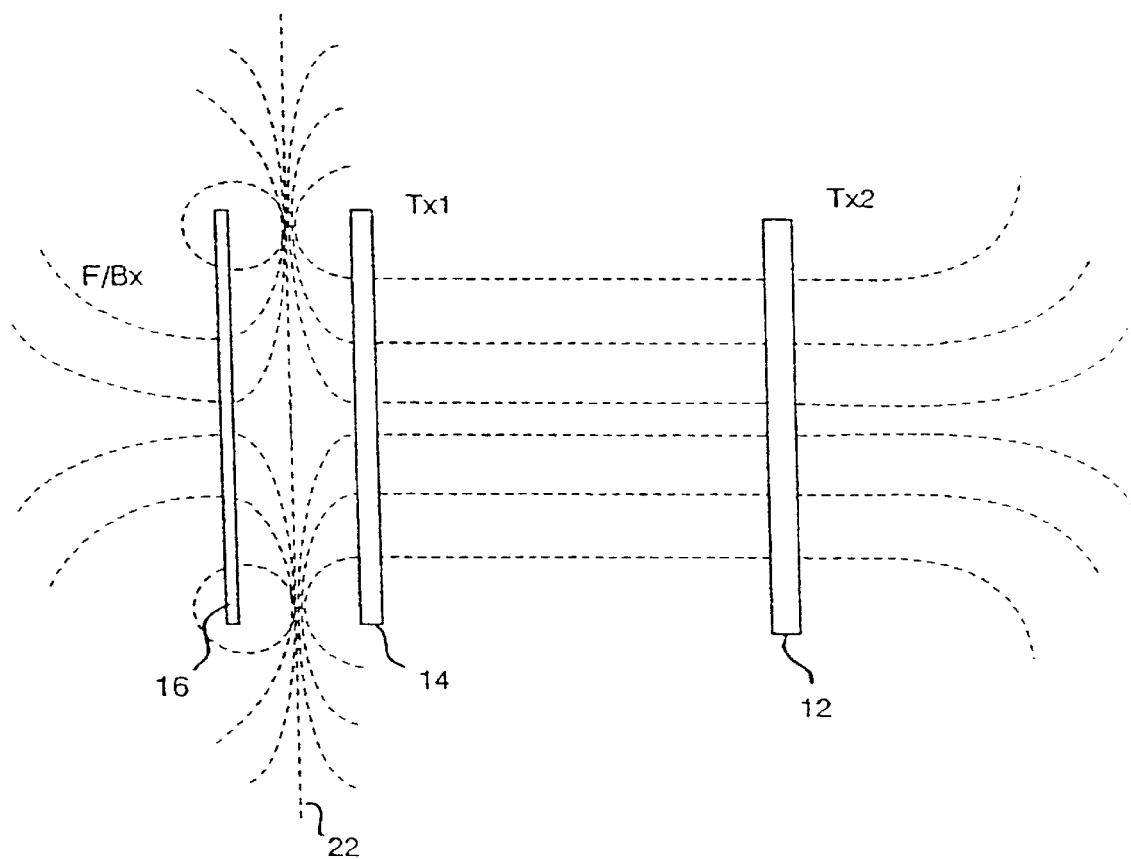
FIG. 3 is a side view of the first embodiment shown in FIG. 1, illustrating the lines of magnetic flux.

The effect of the third transmit coil 16 being wound in the opposite direction to the first and second transmit coils 12 and 14 is that the magnetic field generated by the third transmit coil 16 acts to nullify the magnetic field in the region between the third transmit coil 16 and the second transmit coil 14. As seen in FIG. 3, the third transmit coil 16 creates a vertical region 22 in which there is very little or no magnetic field. The position of the region 22 can be adjusted by altering the distance between the third transmit coil 16 and the second transmit coil 14, and the relative number of windings between the transmit coils 12, 14 and 16. The third transmit coil 16 acts as a feedback coil.

Figure 4:
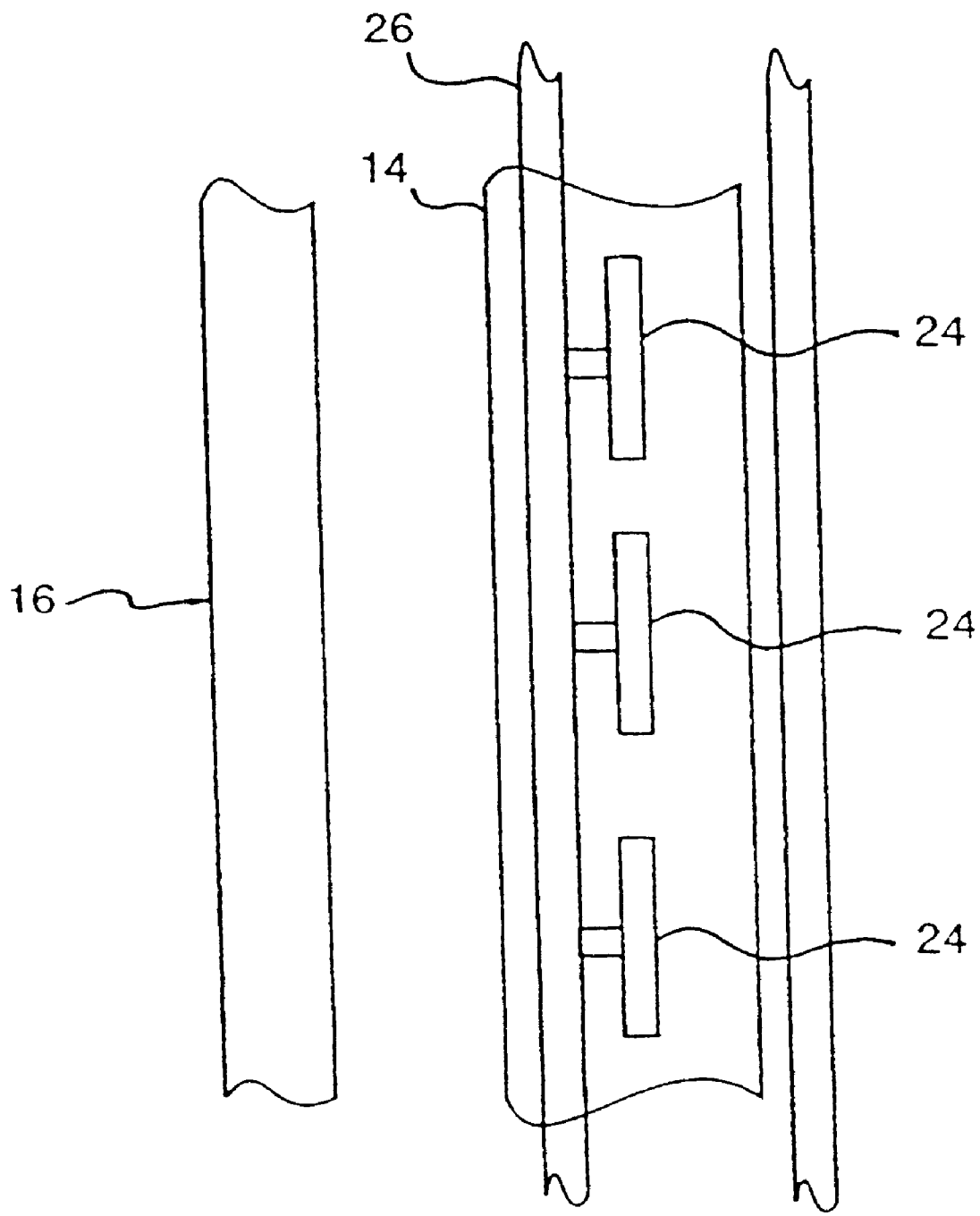
FIG. 4 is an enlarged view of the receive and transmit sections of the first embodiment shown in FIG. 1.

The detection apparatus 10 further comprises a plurality of receive elements 24 mounted in a matrix arrangement on a frame 26 (see FIGS. 1 and 4). The frame 26 and the receive elements 24 are provided adjacent the second and third transmit coils 14 and 16 such that the receive elements 24 are positioned in the region 22.

Figure 5A:
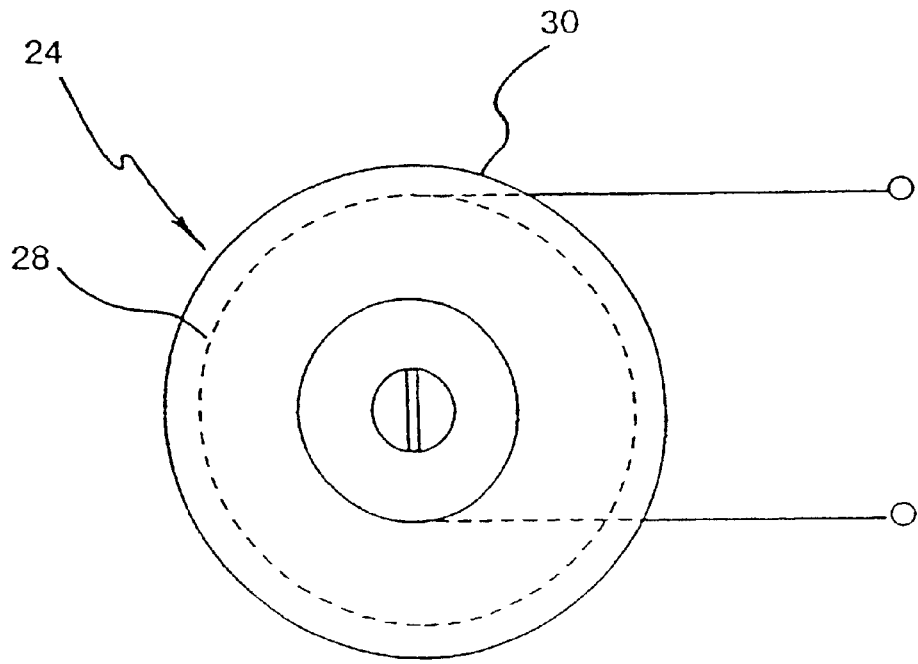
FIG. 5a is a front view of a receive bobbin and coil.
Figure 5B:
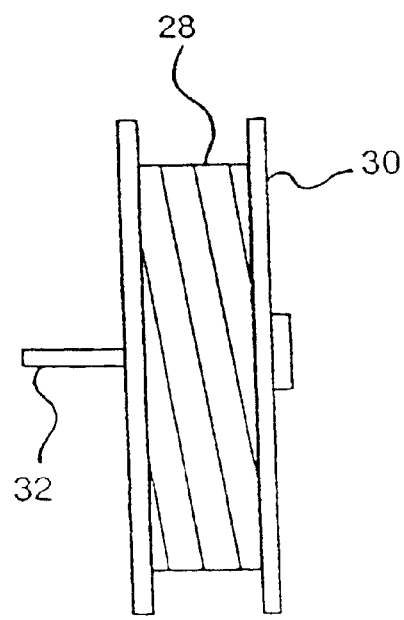
FIG. 5b is a side view of a receive bobbin and coil.
Figure 6:
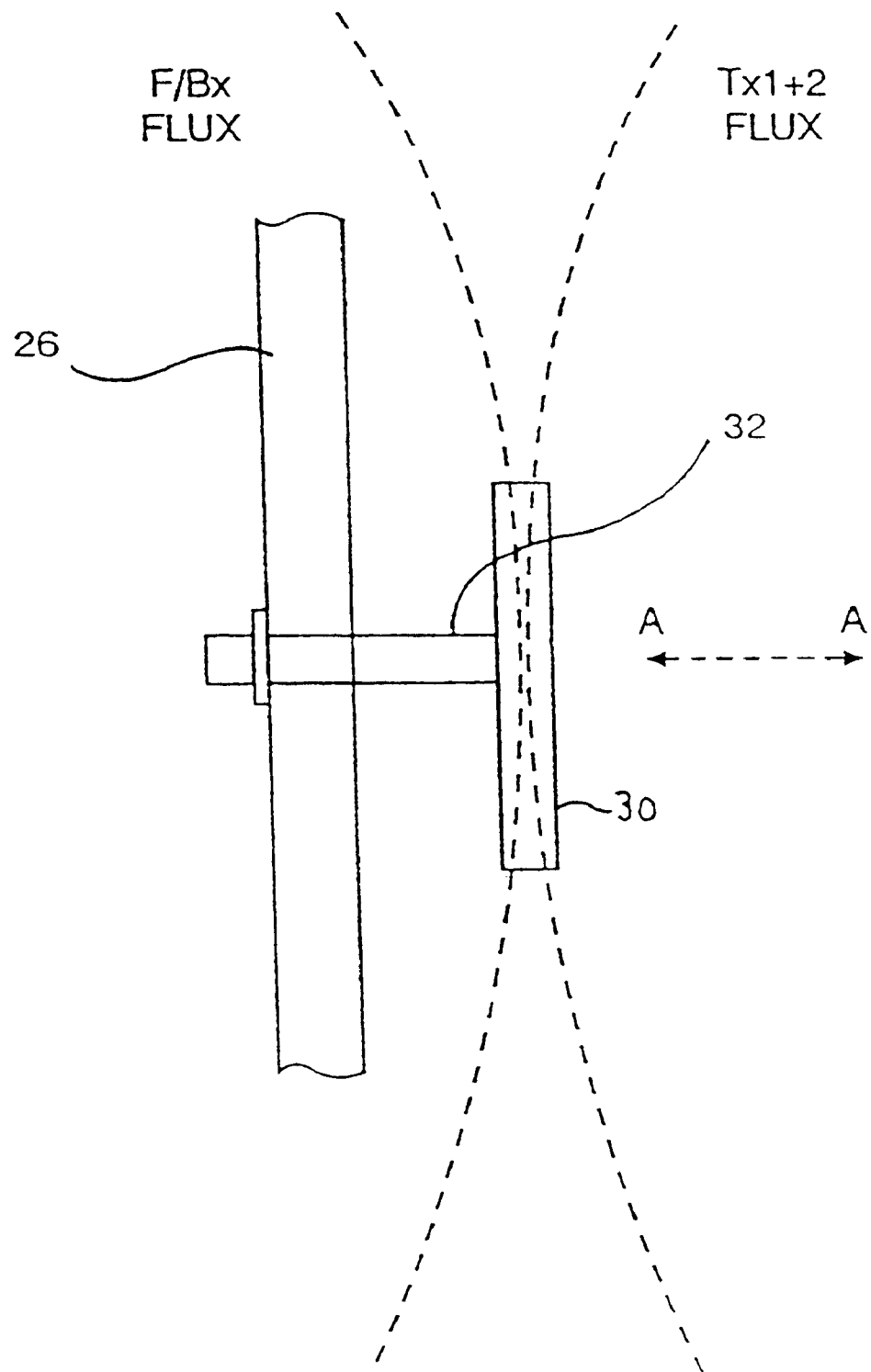
FIG. 6 is a side view of a bobbin attached to a frame illustrating the adjustment thereof.

Each receive element 24 comprises a receive coil 28 wound onto a bobbin 30 (see FIG. 5a). The bobbin 30 is relatively flat such that the receive coil 28 is substantially planar. Each bobbin 30 is mounted to the frame 26 via a spindle 32 (see FIG. 5b). The spindle 32 provides a mechanism for adjusting the position each bobbin 30 relative to the frame 26, as indicated by the arrows labelled "A" in FIG. 6.

The receive elements 24 and the transmit coils 14 and 16 form a sensor panel.

The detection apparatus 10 further comprises a processing means (not shown) responsive to the output from each receive element 24.

In use, the position of each bobbin 30 is adjusted using the corresponding spindle 32 to minimise the output signal from the receive element 24 in the absence of any metallic objects in the volume 18.

Non-metallic objects passing through the volume 18 will not greatly effect the magnetic field and consequently there will be little change in the output signals from the receive elements 24.

The presence of a metallic object in the volume 18 will alter the magnetic fields, resulting in an imbalance at the region 22 (see FIG. 3). The imbalance will be greatest at the position in the region 22 perpendicular to the metallic object and the imbalance will gradually diminish as the distance from the object to the other parts of the region 22 increase. This imbalance in the magnetic field results in an increase in the signals detected by the receive elements 14. The metal type influences the amplitude and/or phase output of the receive elements 24. Further, the size and surface area of the object further influences the amplitude of the signals received by the receive elements 24.

The processing means samples the output of each receive element 24 and produces therefrom an image corresponding the scalar magnetic field at the region 22. In the absence of any metallic objects in the volume 18, the scalar field will be substantially uniform and have a minimal amplitude.

Figure 7:
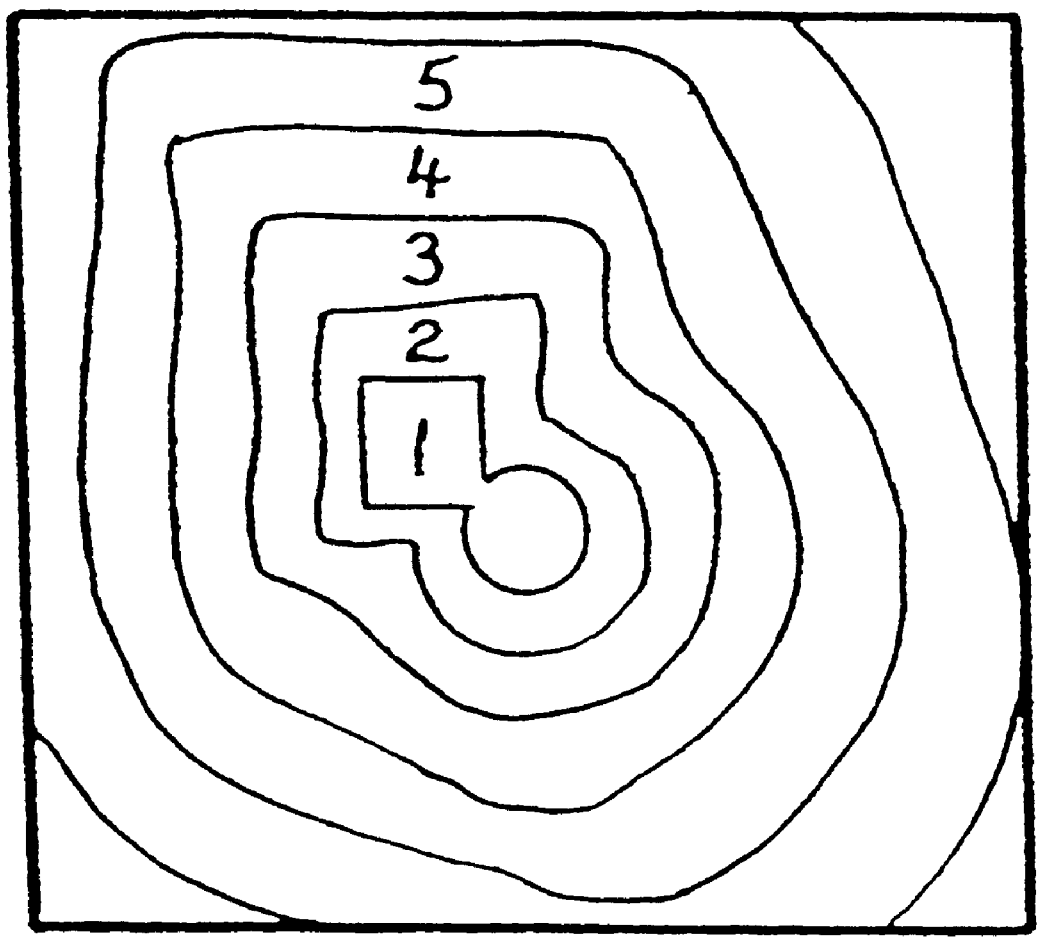
FIG. 7 is a illustrative view of the output from the processing means.

In the presence of a metallic object, the scalar field with be non-uniform as illustrated in FIG. 7. The regions labelled "1" to "5" represent diminishing amplitudes of the scalar magnetic field in the region 22. The processing means is arranged to alter the color and/or intensity of the image to represent different amplitude of the scalier magnetic field. One way of achieving this is to assign the regions '1' to '5' according to percentiles of the signals received. For instance, the region '1' corresponds to the most significant 15% of the signals received, the region '2' the next most significant 15% and so on.-Please If desired, the processing means can perform signal processing on the image to refine the shape of the object. Such processing can include linear interpolation, edge detection, Fourier analysis or boundary collapsing.

Figure 8:
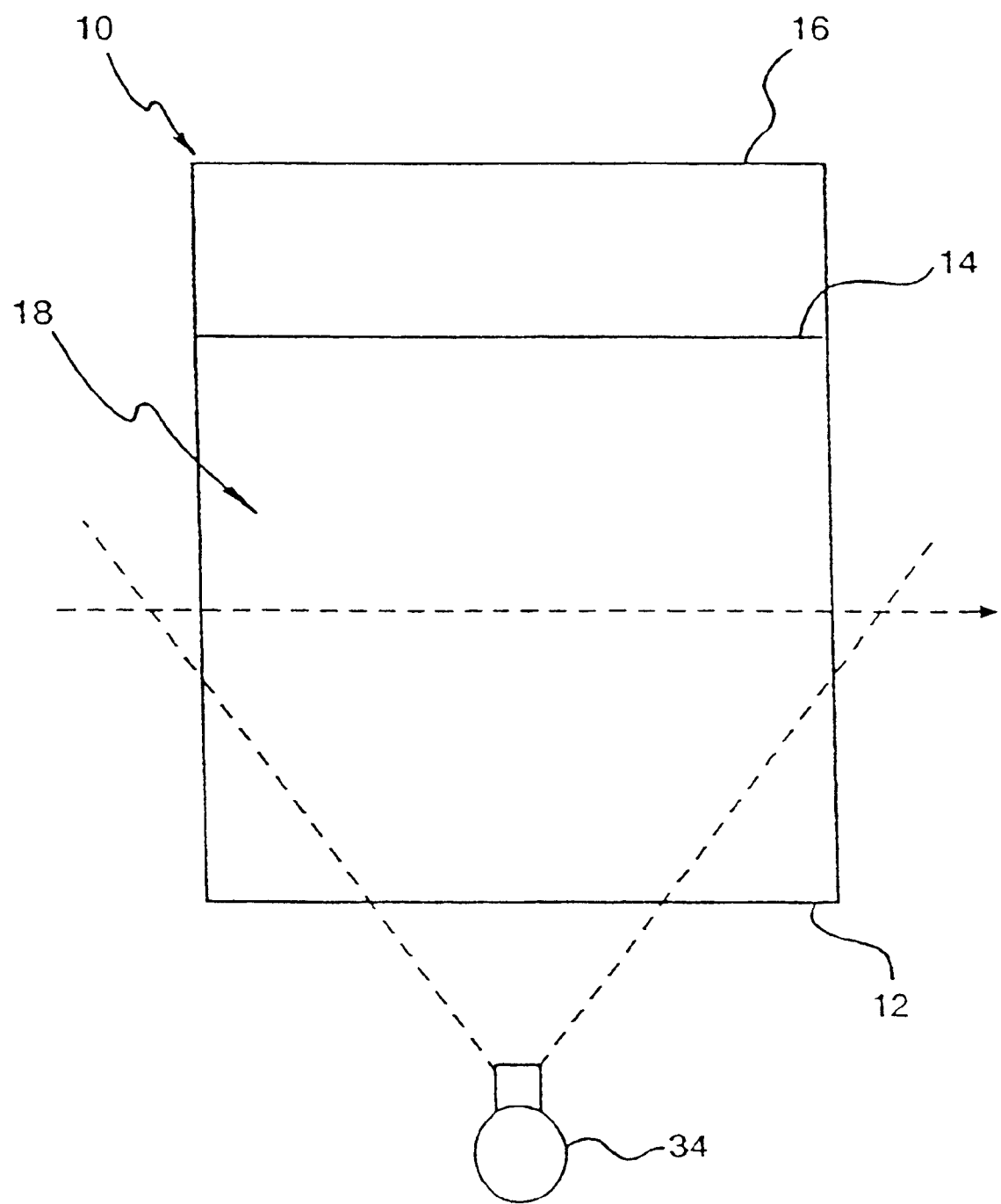
FIG. 8 is a top view of the apparatus illustrating the position of a camera.

A camera 34 is provided adjacent the apparatus 10 alongside the first transmit coil 12 (see FIG. 8). The transmit coil 12 is wound onto a substantially hollow former to provide an aperture 36 therein (see FIG. 1). The camera 34 is arranged to take visual images of the contents of the volume 18 through aperture 36.

The processing means is arranged to overlay the image calculated from the output of the receive element 24 onto the visual image received from the camera 34. This can be achieved using a genlock device.

As a person walks through the volume 18 carrying a metallic object, the magnetic field in the volume 18 will be altered by the presence of the metallic object. This alteration will result in the magnetic filed in the region 22 no longer being minimal near the metallic object. Consequently, signals will be induced on each receive coil 28. The signals are received by the processing means and used to calculate an image corresponding to the magnetic field in the region 22. The image is overlayed onto a visual image received from the camera 34 such that Security Personnel viewing the combined images will see both the person walking through the volume 18 and an indication of the presence and location of metallic objects.

Figure 9:
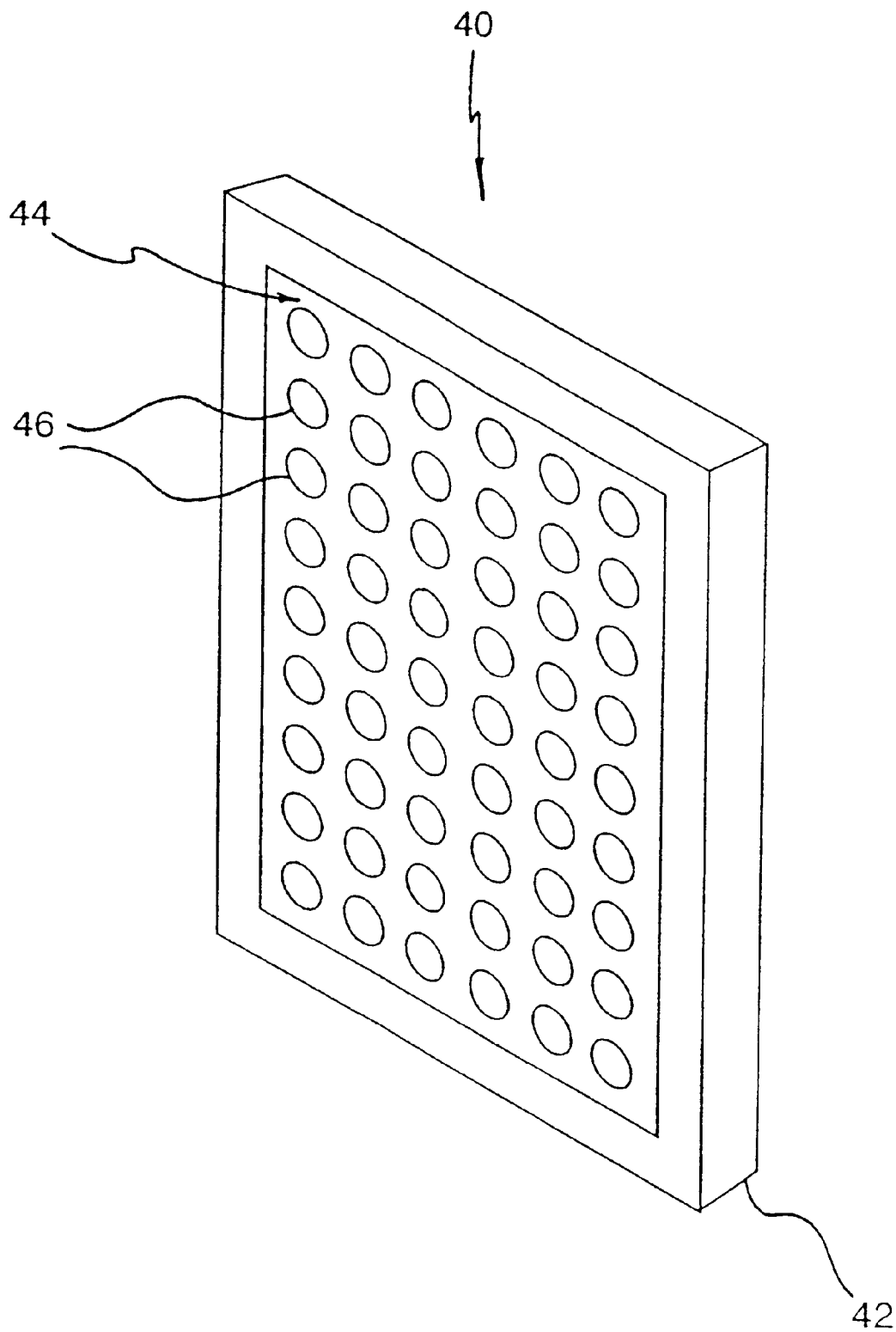
FIG. 9 is a perspective view of the sensor point of the second embodiment.
Figure 10:
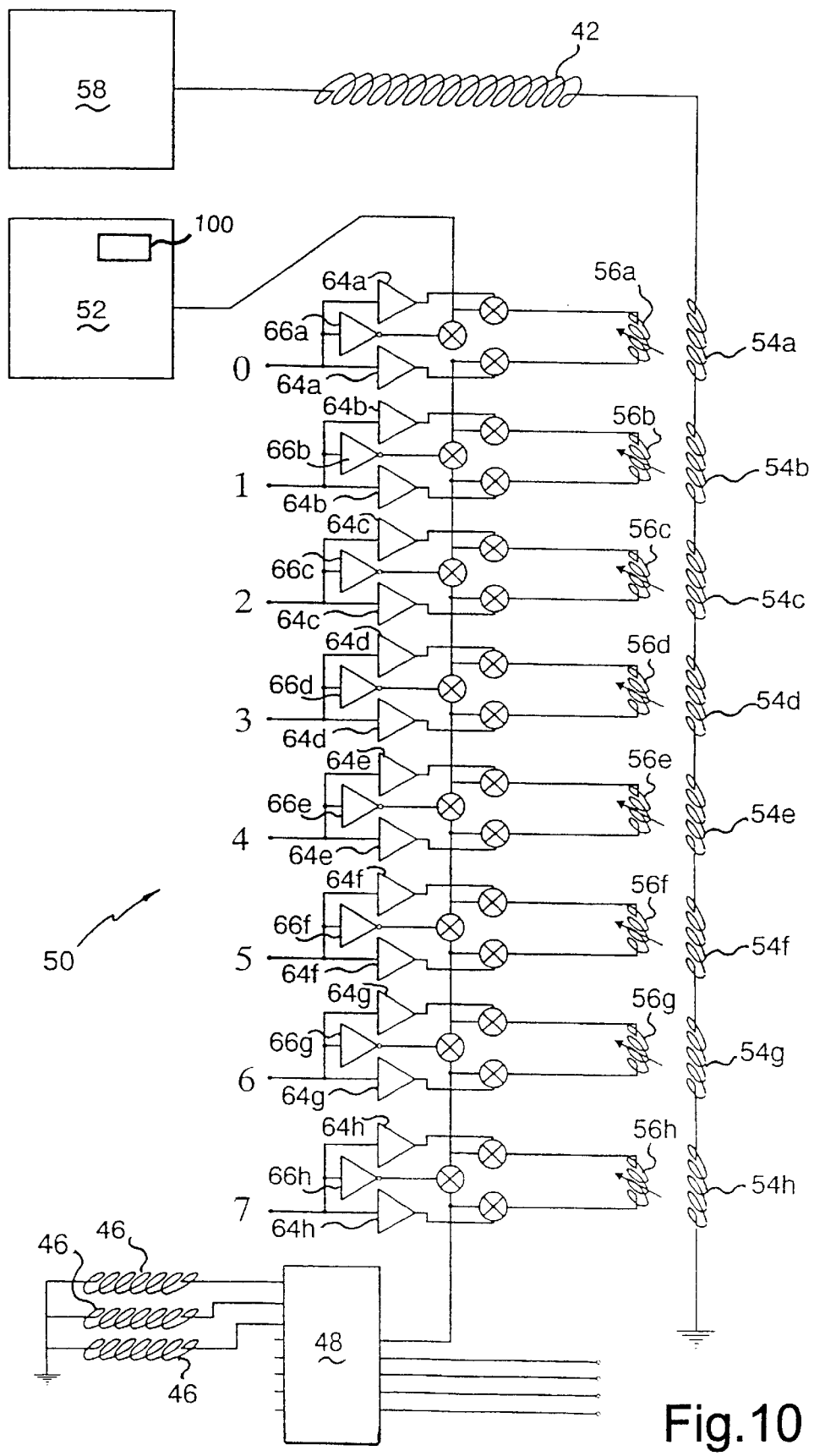
FIG. 10 is a circuit showing the cancellation circuit.

The second embodiment is shown in FIGS. 9 and 10 and relates to a sensor panel 40. The sensor panel 40 comprises a transmit coil 42 provided on a rectangular former. The transmit coil 42 extends around the periphery of a printed circuit board 44 which has a 6×9 matrix of receive coils 46 formed as spiral tracks thereon. In the embodiment, the printed circuit board is multi-layered and each receive coil 46 consists of spiral tracks provided on each layer so as to provide a greater inductance.

The sensor panel 40 of the embodiment is designed to be portable unit and is accordingly of a smaller dimensions that the corresponding panel shown in FIG. 1. However, in other embodiments, the sensor panel may be provided in other sizes as required.

One end of each receive coil 46 is connected to ground. The other end of each receive coil 46 is connected via a cable (not shown), to an analogue multiplexer 48 which forms part of cancellation circuitry 50. The cancellation circuitry 50 is provided remote from the sensor panel 40. Processing circuitry 52 is also provided remote from the panel 40.

The cancellation circuitry 50 comprises eight primary feedback coils 54a–54h, each of which has a secondary feedback coil 56a–56h associated therewith. Each primary feedback coil 54 and its associated secondary feedback coil 56 are wound on a common core so as to provide mutual inductance therebetween. In the embodiment the core includes a ferrite slug (not shown) which can be adjusted into and out of the core so as to alter the degree of mutual inductance. The feedback coils 54a and 56a are configured so as to provided the least amount of mutual inductance therebetween, whilst the feedback coils 54h and 56h are configured to provide the greatest amount of mutual inductance therebetween.

Each of the coils 54a–54h are connected in series with each other and with the transmit coil 42 which in turn is connected to an oscillator 58. As a result, when the transmit coil 52 is being powered by the oscillator 58, each of the primary feedback coils 54a–54h are also being powered, and induce a portion of a feedback signal in the secondary feedback coils 56a–56h according to the degree of mutual inductance between the respective coils 54 and 56. The feedback coils 54b and 56b have twice as much mutual inductance as the coils 54a and 56a and so on. Accordingly, the secondary feedback coils 56a–56h provide portions of a feedback signal, and by isolating each of the coils 56a–56h, up to 256 degrees of feedback signal can be provided.

The isolation of each secondary feedback coil 56 is provided by the first switching circuitry, comprising for each secondary feedback coil 56 isolation switches 60, bypass switch 62, non-inverting buffers 64 and an inverting buffer 66. The non-inverting buffers 64 activate the isolation switches 60, and the inverting buffer 66 activates the bypass switch 62. The inputs to the non-inverting buffer 64 and the inverting buffer 66 are connected together.

The two isolation switches 60, the bypass switch 62, the two non-inverting buffers 64 and the inverting buffer 66 are provided for each feedback coil 56a–56h. For convenience, in FIG. 10 the isolating switch 60, the bypass switch 62, and the buffers 64 and 66 have the letter "a"–"h" appended thereto according to the corresponding secondary feedback coil 56 with which they are associated.

The secondary feedback coils 56 are provided in electrical series via the associated switching circuitry and are connected at one end to the processor circuitry 52 and at the other end to the output of the analog multiplexer 48. Using the address inputs of the analog multiplexer 48 it is possible to connect each receive coil 46 to the processor circuitry 50 via the secondary feedback coils 56.

By adjusting whether a high or low signal appears at the input to the buffers 64 and 66 associated with each secondary feedback coil 56, it is possible to selectively isolate any combination of the secondary feedback coils 56, so as to adjust the amount of feedback in order to more accurately compensate for any signal induced in the particular receive coils 46. When the input to the buffers 64 and 66 is high, the non-inverting buffer 64 will present a high signal to the isolating switches 60, which causes the switches 60 to operate as a closed circuit. Conversely, the inverting buffer 66 will present a low signal to the bypass switch 62 which will act as an open circuit. In this state, the corresponding secondary feedback coil 56 forms part of the connection between the analog multiplexer 48 and the processing circuitry 52 and the portion of the feedback signal induced in the secondary feedback coil 56 is combined with the output from the receive coil 46 which is being addressed.

When the input to the buffer 64 and 66 associated with a secondary feedback coil 56 are low, the non-inverting buffer 64 will present a low signal to the isolating switches 60, which will act as open circuit, thereby isolating the corresponding secondary feedback coil 56 from the connection between the analogue multiplexer 48 and the processor circuitry 52. Further, the inverting buffer 66 will present a high signal to the bypass switch 62 which will act as a short circuit in order to provide a path for the signal to flow from the analogue multiplexer to the processor circuitry 52.

The embodiment also includes a non-volatile memory 100 (see FIG. 10) in which is stored, for each receive coil 46, the combination of which secondary feedback coils 56 are to be isolated and which are to be included. As the address lines of the analog multiplexer 48 are varied so as to obtain an output from each of the receive coils 46 in turn, so the non-volatile memory is accessed to determine which feedback coil 56 are to be included to compensate for the transmit coil 42, and the appropriate signals sent to the buffers 64a and 66a to 64h and 66h accordingly.

The processing circuitry 52 is arranged to produce a scalar image from the amplitude and phase of the signals received from each receive coil 46 having regard to the cancellation performed by the secondary feedback coils 56. In this regard the sensor panel 40 of the embodiment can be arranged to perform as a metal detector in a similar manner to the first embodiment, however, in a more portable form.

However, it is has been discovered that the sensor panel 40 of the second embodiment can also be used in other applications. In particular, the sensor panel 40 and associated circuitry can be used in the detection of land mines and metal-cased ordinances. In this arrangement, the sensor panel 40 would be arranged parallel to the ground and the receive coils 46 would provide signals induced from the ground. In this regard, the presence of metallic compounds within the ground will produce some form of residual signal in each of the receive coils 46. The presence of metal-cased land mines or ordinances will induce a distorted signal in some of the receive coils 46 in a similar manner to that described above in relation to the first embodiment with regard to metallic objects in the predefined volume. Accordingly, a land mine or ordinance with a metallic case will show up as increased activity by at least some of the sensors 46. Further it has been found that plastic cased land mines also produce a variation of the signals received by some of the receive coils 46, in that the plastic land mines contain little or no ferric or magnetic components, and accordingly the response received from the area surrounding the plastic land mine is reduced compared with the background response of the ground. Accordingly, a plastic land mine shows up as a reduction in the received signal in the receive coils 46. By further processing the phase of received signals in each of their receive coils 46, further discrimination of materials can be achieved.

It should be appreciated that other forms of switching circuitry can be provided without departing from the scope of the invention.

Further it is envisaged that the sensor panels of the second embodiment may be produced in larger scale and used to form part of the detection apparatus, replacing the transmits coils, feedback coils and receive coils. In particular, two such sensor panels can be provided on opposing sides of the predetermined volume. In such a system, it is preferred that the transmit coils of the sensor panels act cooperatively to produce parallel lines of magnetic flux.

It should be appreciated that the scope of this invention is not limited to the particular embodiment described above.

What is claimed is:

1. A magnetic detection apparatus for sensing an object in a sensing region, the apparatus including:
   a magnetic field generating means for producing a magnetic field within said sensing region in response to a source signal;
   a plurality of magnetic receiving elements arranged in a matrix, said matrix comprising an array of receiving elements arranged in rows and columns on a same side of said sensing region, each magnetic receiving element being responsive to changes in the magnetic field within the sensing region to provide an output signal;
   cancellation means for generating a feedback signal adapted to minimize spurious magnetic effects of the magnetic field generating means on the output signals of the magnetic receiving elements; and
   signal processing means for processing said output signals of the magnetic receiving elements and for producing an image corresponding to variations produced in said output signals by the object in the sensing region whereby, in use, an indication of the location and approximate shape of the object in the sensing region can be obtained.

2. A magnetic detection apparatus as claimed in claim 1, wherein the cancellation means comprises a feedback coil arranged to be excited by the source signal, the feedback coil inducing a feedback signal in each magnetic receiving element to negate the effects of the magnetic field generating means.

3. A magnetic detection apparatus as claimed in claim 1, wherein the cancellation means comprises a plurality of feedback coils, one for each magnetic receiving element, and wherein each feedback coil is provided in close physical proximity to a corresponding magnetic receiving element, each feedback coil inducing a feedback signal in its corresponding receiving element to negate the effects of the magnetic field generating means.

4. A magnetic detection apparatus as claimed in claim 1, wherein the cancellation means comprises a plurality of feedback coils, each coil contributing a portion of a feedback signal, first switching means arranged to selectively isolate each feedback coil so as to remove its contribution to the feedback signal, and second switching means arranged to combine said feedback signal with each output signal in turn.

5. A magnetic detection apparatus as claimed in claim 4, wherein the cancellation means further comprises memory means for storing information concerning which feedback coils are to be isolated for each receiving element.

6. A magnetic detection apparatus as claimed in claim 1, wherein each of said magnetic receiving elements are provided in a substantially planar configuration so as to form a sensor panel.

7. A magnetic detection apparatus as claimed in claim 6, wherein each magnetic receiving element comprises a receive coil.

8. A magnetic detection apparatus as claimed in claim 7, wherein each receive coil is wound on a bobbin, the bobbins being provided on the sensor panel.

9. A magnetic detection apparatus as claimed in claim 8, wherein the position of the bobbins are adjustable in a direction transverse to the plane of the sensor panel whereby the output signal from each receive coil in the absence of any object in the sensing region can be minimized.

10. A magnetic detection apparatus as claimed in claim 7, wherein each receive coil is provided on a printed circuit board as a spiral track thereon.

11. A magnetic detection apparatus as claimed in claim 10, wherein the printed circuit board is a multi-layer printed circuit board.

12. A magnetic detection apparatus as claimed in claim 1, wherein the magnetic field generating means comprises a transmit coil.

13. A magnetic detection apparatus as claimed in claim 12, wherein the transmit coil is provided around the periphery of the matrix of magnetic receiver elements.

14. A magnetic detection apparatus as claimed in claim 1, wherein the magnetic field generating means comprises a first and a second transmit coil connected to an oscillator, said transmit coils being provided in a substantially parallel, spaced apart manner on opposing sides of a predetermined volume.

15. A magnetic detection apparatus as claimed in claim 14, wherein the magnetic field generating means, the magnetic receiving elements and the cancellation means form a sensor panel.

16. A magnetic detection apparatus as claimed in claim 15, wherein the signal processing means is arranged to further process the output signals from said receiving elements by at least one of the following methods: interpolation, Fourier analysis, edge detection, or boundary collapsing.

17. A magnetic detection apparatus as claimed in claim 16, further comprising a camera arranged to take pictures of the volume, said image being superimposed on the pictures of said volume.

18. A magnetic detection apparatus as claimed in claim 17, wherein said signal processing means is responsive to a phase and amplitude of the output signals from each receiving element to determine therefrom the type of material being detected.

19. A magnetic detection apparatus for sensing an object in a sensing region, the apparatus including:
   a magnetic field generator configured to produce a magnetic field within said sensing region in response to a source signal;
   a plurality of magnetic receiving elements arranged in a matrix, said matrix comprising an array of receiving elements arranged in rows and columns on a same side of said sensing region, each magnetic receiving element being responsive to changes in the magnetic field within the sensing region to provide an output signal;
   a feedback circuit configured to generate a feedback signal adapted to minimize spurious magnetic effects of the magnetic field generator on the output signals of the magnetic receiving elements; and
   a signal processor configured to process said output signals of the magnetic receiving elements and to produce an image corresponding to variations produced in said output signals by the object in the sensing region whereby, in use, an indication of the location and approximate shape of the object in the sensing region can be obtained.

20. A magnetic detection apparatus as claimed in claim 19, wherein the feedback circuit comprises a feedback coil arranged to be excited by the source signal, the feedback coil inducing a feedback signal in each magnetic receiving element to negate the effects of the magnetic field generator.

21. A magnetic detection apparatus as claimed in claim 19, wherein the feedback circuit comprises a plurality of feedback coils, one for each magnetic receiving element, wherein each feedback coil is provided in close physical proximity to a corresponding magnetic receiving element, and wherein each feedback coil induces a feedback signal in its corresponding receiving element to negate the effects of the magnetic field generator.

22. A magnetic detection apparatus as claimed in claim 19, wherein the feedback circuit comprises:

a plurality of feedback coils, each coil contributing a portion of a feedback signal;

a first switching mechanism arranged to selectively isolate each feedback coil so as to remove its contribution to the feedback signal; and a second switching mechanism arranged to combine said feedback signal with each output signal in turn.

23. A magnetic detection apparatus as claimed in claim 22, wherein the feedback circuit further comprises a memory configured to store information concerning which feedback coils are to be isolated for each receiving element.

24. A magnetic detection apparatus as claimed in claim 19, wherein each of said magnetic receiving elements are provided in a substantially planar configuration so as to form a sensor panel.

25. A magnetic detection apparatus as claimed in claim 24, wherein each magnetic receiving element comprises a receive coil.

26. A magnetic detection apparatus as claimed in claim 25, wherein each receive coil is wound on a bobbin, the bobbins being provided on the sensor panel.

27. A magnetic detection apparatus as claimed in claim 26, wherein the position of the bobbins are adjustable in a direction transverse to the plane of the sensor panel whereby the output signal from each receive coil in the absence of any object in the sensing region can be minimized.

28. A magnetic detection apparatus as claimed in claim 25, wherein each receive coil is provided on a printed circuit board as a spiral track thereon.

29. A magnetic detection apparatus as claimed in claim 28, wherein the printed circuit board is a multi-layer printed circuit board.

30. A magnetic detection apparatus as claimed in claim 19, wherein the magnetic field generator comprises a transmit coil.

31. A magnetic detection apparatus as claimed in claim 30, wherein the transmit coil is provided around the periphery of the matrix of magnetic receiver elements.

32. A magnetic detection apparatus as claimed in claim 19, wherein the magnetic field generator comprises first and second transmit coils connected to an oscillator, said transmit coils being provided in a substantially parallel, spaced apart manner on opposing sides of a predetermined volume.

33. A magnetic detection apparatus as claimed in claim 32, wherein the magnetic field generator, the magnetic receiving elements and the feedback circuit form a sensor panel.

34. A magnetic detection apparatus as claimed in claim 33, wherein the signal processor is arranged to further process the output signals from said receiving elements by at least one of the following methods: interpolation, Fourier analysis, edge detection, or boundary collapsing.

35. A magnetic detection apparatus as claimed in claim 34, further comprising a camera arranged to take pictures of the volume, said image being superimposed on the pictures of said volume.

36. A magnetic detection apparatus as claimed in claim 35, wherein said signal processor is responsive to a phase and amplitude of the output signals from each receiving element to determine therefrom the type of material being detected.

* * * * *